(12) United States Patent
Kim

(10) Patent No.: US 10,747,256 B1
(45) Date of Patent: Aug. 18, 2020

(54) PEDAL APPARATUS FOR PROTECTION OF DRIVER

(71) Applicants: Hyundai Motor Company, Seoul (KR); Kia Motors Corporation, Seoul (KR)

(72) Inventor: Eun Sik Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/743,535

(22) Filed: Jan. 15, 2020

(30) Foreign Application Priority Data

Oct. 16, 2019 (KR) .................. 10-2019-0128338

(51) Int. Cl.
| | |
|---|---|
| *G05G 1/30* | (2008.04) |
| *B60T 7/04* | (2006.01) |
| *G05G 1/32* | (2008.04) |
| *B60T 7/06* | (2006.01) |
| *G05G 1/46* | (2008.04) |
| *G05G 1/445* | (2008.04) |
| *B60K 26/02* | (2006.01) |

(52) U.S. Cl.
CPC .............. *G05G 1/32* (2013.01); *B60K 26/02* (2013.01); *B60T 7/065* (2013.01); *G05G 1/445* (2013.01); *G05G 1/46* (2013.01)

(58) Field of Classification Search
CPC .. G05G 1/30; G05G 1/32; G05G 1/38; G05G 1/445; G05G 1/46; B60T 7/06; B60T 7/065; B60K 20/04; B60K 23/02; B60K 26/02; B60K 2026/026; B60R 21/09
See application file for complete search history.

(56) References Cited

U.S. PATENT DOCUMENTS

| | | | | |
|---|---|---|---|---|
| 6,055,883 | A * | 5/2000 | Kato ..................... | B60R 21/09 180/274 |
| 6,070,488 | A * | 6/2000 | Yabusaki ............... | B60T 7/065 180/274 |
| 7,568,545 | B2 * | 8/2009 | Tanigawa ............... | B60R 21/09 180/274 |
| 8,196,695 | B2 * | 6/2012 | Kim ...................... | B60R 21/09 180/274 |

(Continued)

FOREIGN PATENT DOCUMENTS

| | | | | |
|---|---|---|---|---|
| DE | 102010025566 | A1 * | 12/2011 | ............ B60R 21/09 |
| KR | 20130116563 | A | 10/2013 | |
| WO | WO-2008119653 | A1 * | 10/2008 | ............ B60R 21/09 |

*Primary Examiner* — Adam D Rogers
(74) *Attorney, Agent, or Firm* — Slater Matsil, LLP

(57) ABSTRACT

A pedal apparatus for a vehicle includes a pedal member to which a pedal arm is rotatably coupled, a cowl bracket fixedly coupled to the pedal member, and a collision rotation bracket coupled to the cowl bracket. The collision rotation bracket is configured to be rotated with respect to the cowl bracket when the collision rotation bracket comes into contact with a vehicle body fixture in accordance with rearward movement of the pedal member caused upon occurrence of a collision accident. The pedal arm is configured to be forcibly pushed in a forward direction by the collision rotation bracket during rotation of the collision rotation bracket, thereby causing the pedal arm to be forcibly rotated in the forward direction.

18 Claims, 11 Drawing Sheets

(56) References Cited

U.S. PATENT DOCUMENTS

| | | | | |
|---|---|---|---|---|
| 8,590,659 B2 * | 11/2013 | Uenver | ............. | B60T 7/065 180/274 |
| 8,613,341 B2 * | 12/2013 | Min | ............. | B60T 7/065 180/274 |
| 9,256,242 B2 * | 2/2016 | Kim | ............. | G05G 1/30 |
| 9,523,998 B2 * | 12/2016 | Sukonthapanich | .... | G05G 1/327 |
| 9,796,363 B2 * | 10/2017 | Leem | ............. | B60T 7/065 |
| 2005/0050980 A1 * | 3/2005 | Park | ............. | B60T 7/065 74/512 |

* cited by examiner

Rearward ←      → Forward

Forward ←     → Rearward

PEDAL APPARATUS FOR PROTECTION OF DRIVER

CROSS-REFERENCE TO RELATED APPLICATIONS

This application claims priority to Korean Patent Application No. 10-2019-0128338, filed in the Korean Intellectual Property Office on Oct. 16, 2019, the disclosure of which is incorporated herein by reference.

TECHNICAL FIELD

The present invention relates to a pedal apparatus for protection of a driver.

BACKGROUND

In a general vehicle, an accelerator pedal, a brake pedal and a clutch pedal, which are manipulated by the foot of the driver, are mounted at a dash panel disposed beneath a driver seat.

Meanwhile, when a crash or rear-end collision accident occurs, thereby causing an engine compartment to collapse by impact force generated due to the accident, there may be a problem in that the leg of the driver may be injured by a pedal apparatus.

In order to prevent such a problem, technologies for preventing rearward thrust of pedals (thrust toward a driver seat) and rearward rotation of pedals (rotation toward the driver seat) through additional application of separate constructions (a pedal arm-side stopper, a cowl cross bar-side stopper, etc.) has been developed.

However, most conventional technologies have drawbacks of an increase in the number of elements, an increase in weight, and an increase in cost due to additional application of separate constructions in addition to elements constituting a pedal apparatus.

In particular, upon oblique offset collision, thrust of a pedal proceeds from a front lower position to a rear upper position in an inclined direction in a state in which the pedal is offset by a certain angle. When such an oblique offset collision occurs, the cowl cross bar-side stopper in a conventional cantilever structure cannot effectively suppress rearward thrust of a pedal arm and, as such, there may be a drawback in that injury of the driver leg caused by the pedal cannot be surely prevented.

The above matters disclosed in this section are merely for enhancement of understanding of the general background of the invention and should not be taken as an acknowledgement or any form of suggestion that the matters form the related art already known to a person skilled in the art.

SUMMARY

The present invention relates to a pedal apparatus for protection of a driver. Particular embodiments relate to a pedal apparatus for protection of a driver which is capable of maximally preventing injury of the driver leg (shank shock, ankle dislocation, etc. caused by the pedal apparatus during a collision accident.

Embodiments of the present invention can solve problems such as those described above.

Embodiments of the present invention provide a pedal apparatus for protection of a driver that is capable of inducing forced forward rotation of a pedal arm using a collision rotation bracket connected to a cowl bracket, when a collision accident occurs, such that rearward thrust and rearward rotation of the pedal arm are prevented, thereby maximally preventing injury of the driver leg caused by the pedal arm.

For example, a pedal apparatus according to an embodiment of the present invention may maximally prevent injury of the driver leg caused by the pedal arm even in the case of an oblique offset collision.

In accordance with an aspect of the present invention, a pedal apparatus for protection of a driver includes a pedal member to which a pedal arm is rotatably coupled, a cowl bracket fixedly coupled to the pedal member, and a collision rotation bracket coupled to the cowl bracket. The collision rotation bracket is rotated with respect to the cowl bracket when the collision rotation bracket comes into contact with a vehicle body fixture in accordance with rearward movement of the pedal member caused upon occurrence of a collision accident, and the pedal arm is forcibly pushed in a forward direction by the collision rotation bracket during rotation of the collision rotation bracket, thereby causing the pedal arm to be forcibly rotated in the forward direction.

The cowl bracket and the collision rotation bracket may be coupled through a double coupling point structure provided by a rotation shaft and a stop lamp switch. The stop lamp switch may be separated from the cowl bracket when the collision rotation bracket comes into contact with the vehicle body fixture in accordance with the rearward movement of the pedal member caused upon occurrence of the collision accident. The collision rotation bracket may rotate about the rotation shaft when the stop lamp switch is separated from the cowl bracket. The pedal arm may be forcibly rotated in the forward direction by rotation force of the collision rotation bracket generated when the collision rotation bracket rotates about the rotation shaft.

The cowl bracket may be formed to have a greater cross-sectional thickness than the pedal member and the collision rotation bracket such that the cowl bracket has greater strength and rigidity than the pedal member and collision rotation bracket, for stable rotation of the collision rotation bracket upon occurrence of the collision accident.

The collision rotation bracket may include an intermediate coupling section coupled to the cowl bracket by means of a rotation shaft and a stop lamp switch, an upper contact section extending upwards from the intermediate coupling section, the upper contact section coming into contact with the vehicle body fixture when the pedal member is thrust rearwards upon occurrence of the collision accident, and a lower rotation section extending downwards from the intermediate coupling section, the lower rotation section forcibly pushing the pedal arm in the forward direction when the collision rotation bracket rotates due to contact thereof with the vehicle body fixture, thereby causing the pedal arm to be forcibly rotated in the forward direction.

The collision rotation bracket may not rotate with respect to the cowl bracket when the collision rotation bracket is in a state of being coupled to the cowl bracket by means of the rotation shaft and the stop lamp switch before occurrence of the collision accident. The collision rotation bracket may be rotated about the rotation shaft when the stop lamp switch is separated from the cowl bracket as the upper contact section comes into contact with the vehicle body fixture due to the collision accident.

The upper contact section may be formed to be inclined toward one side of the pedal arm while extending upwards from the intermediate coupling section, and the upper contact section may be bent to protrude rearwards.

The lower rotation section may be formed to be inclined toward one side of the pedal arm while extending downwards from the intermediate coupling section, similarly to the upper contact section, and the lower rotation section may be bent to protrude forwards such that the lower rotation section contacts one surface of the pedal arm.

The collision rotation bracket may have a structure in which a linear distance from a center of the rotation shaft to an end of the lower rotation section is greater than a linear distance from the center of the rotation shaft to an end of the upper contact section, for an increase in a forward rotation amount of the pedal arm during rotation of the collision rotation bracket.

The pedal arm may be one of a brake pedal, a clutch pedal and an accelerator pedal.

In the pedal apparatus for protection of the driver according to the embodiment of the present invention, when a crash or rear-end collision accident occurs, the pedal arm is forcibly rotated in a forward direction by the collision rotation bracket rotating upon occurrence of the accident and, as such, is spaced away from the driver. Accordingly, injury of the driver leg caused by the pedal arm may be maximally prevented. In particular, the configuration for forcibly rotating the pedal arm in a forward direction can be embodied without a great increase in the number of elements and, as such, there may be effects of achieving a reduction in weight and a reduction in cost, as compared to conventional structures.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
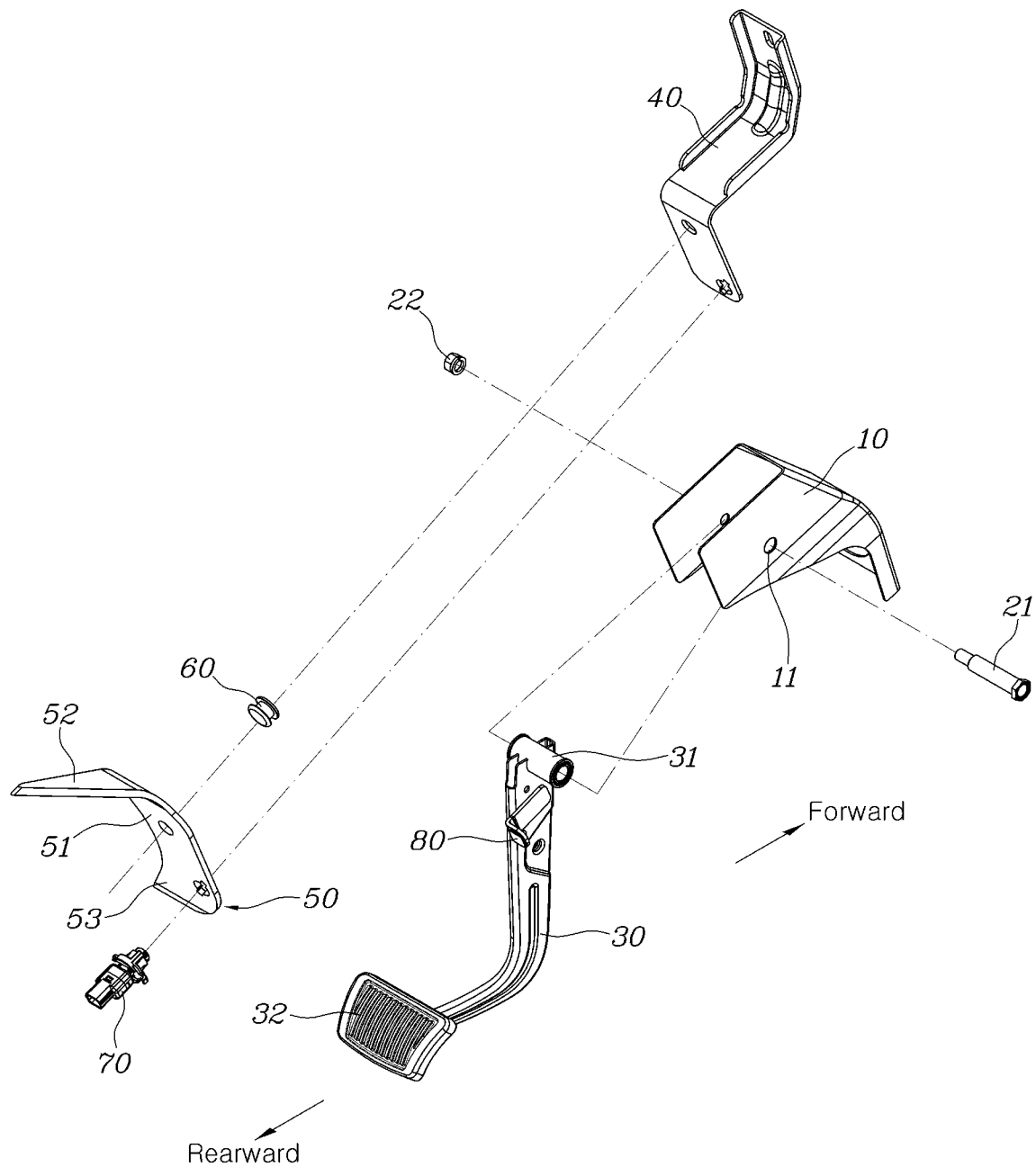
FIGS. 1 and 2 are an exploded perspective view and an assembled perspective view illustrating a pedal apparatus for protection of a driver according to an embodiment of the present invention, respectively.
Figure 2:
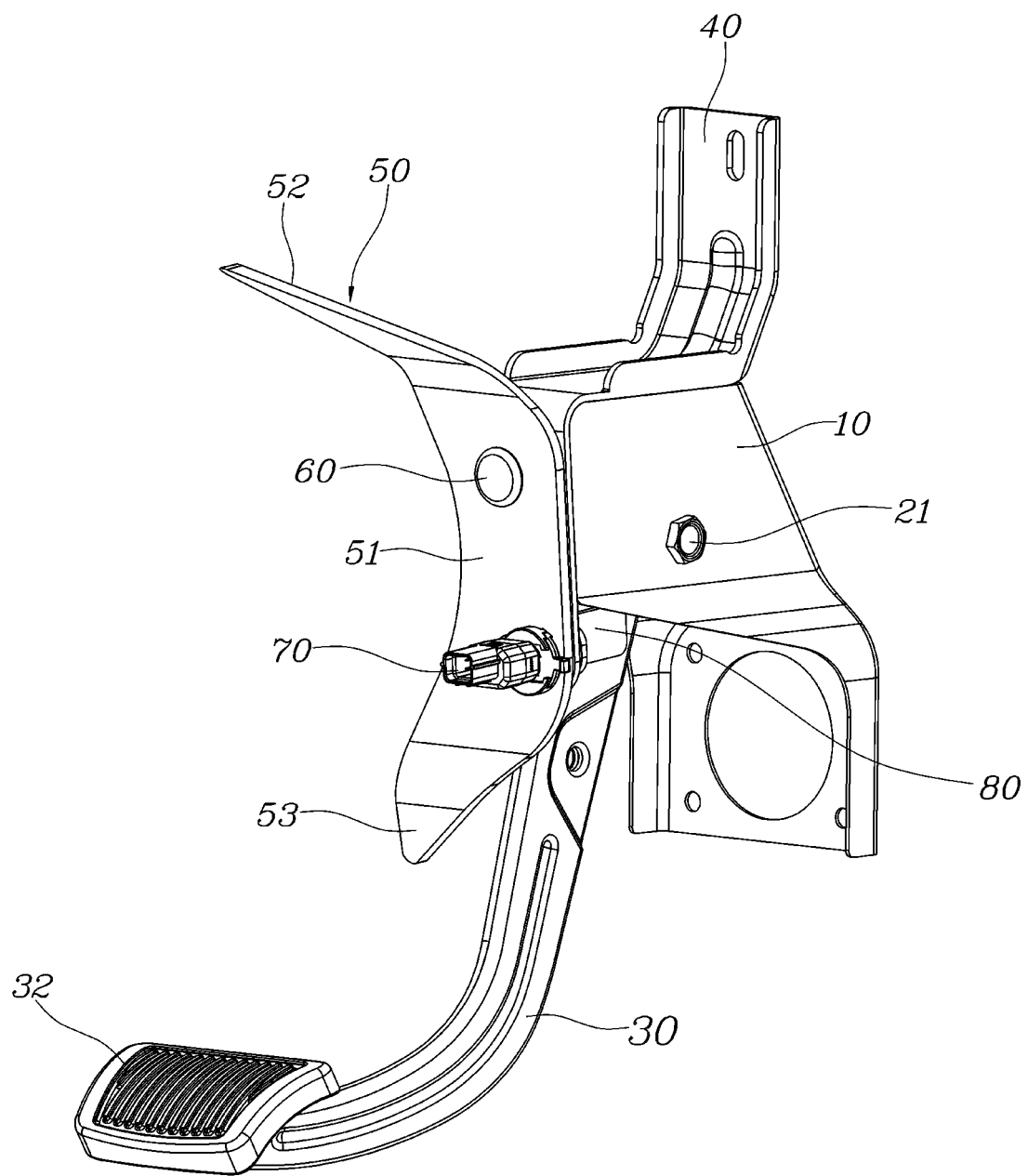
Figure 3:
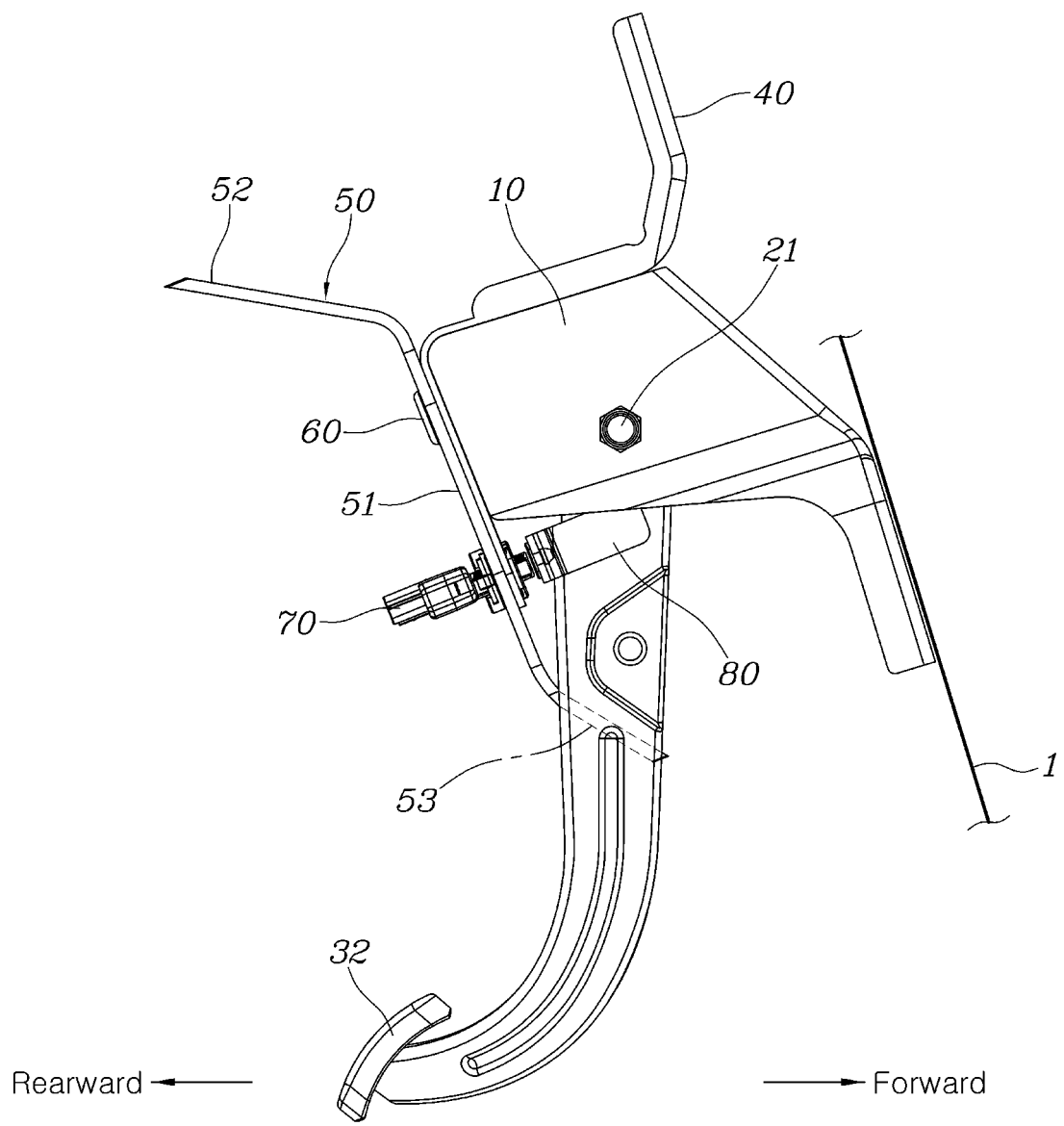
FIGS. 3 to 6 are a right side view, a left side view, a front view and a bottom view corresponding to FIG. 2, respectively.
Figure 4:
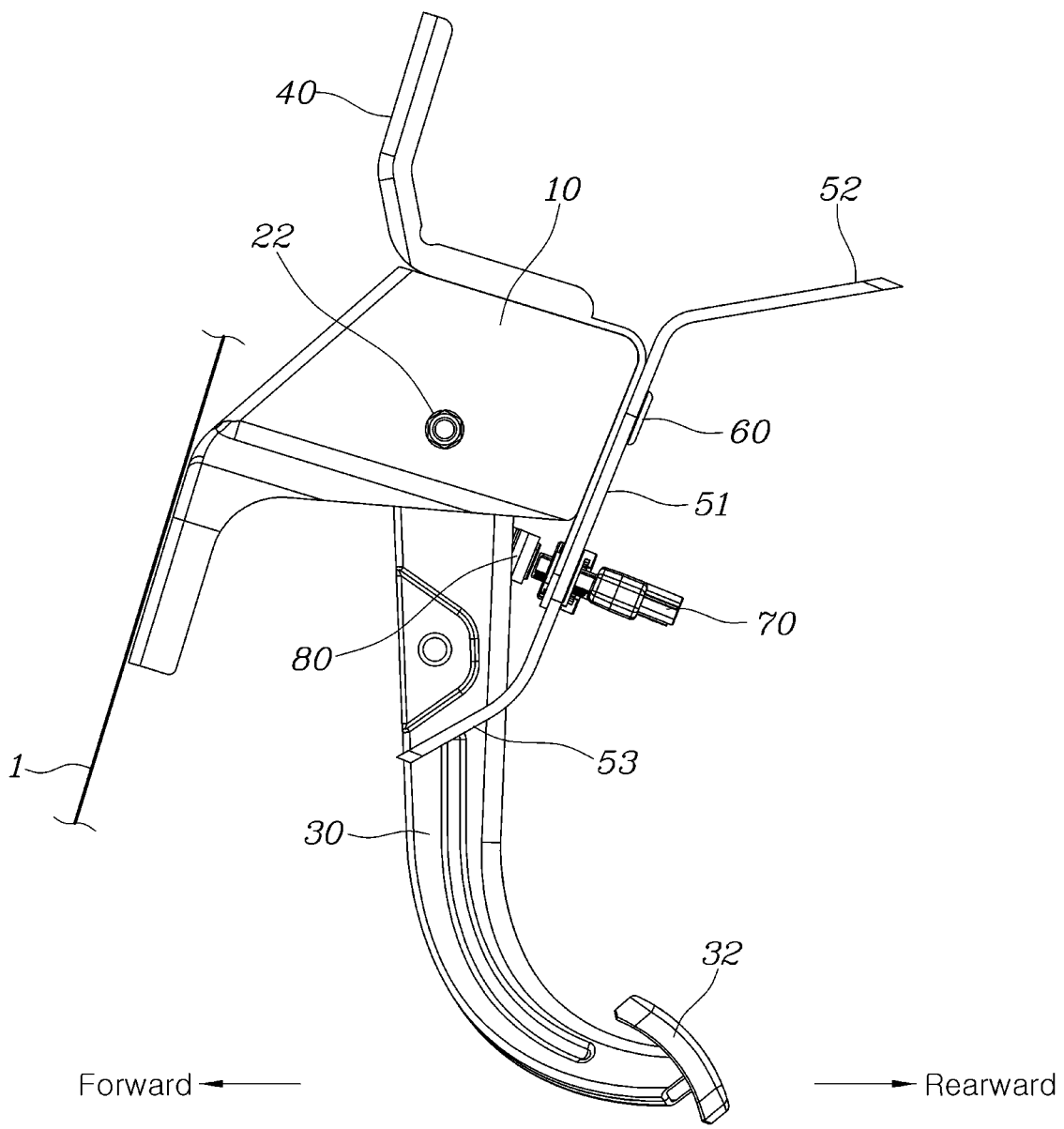
Figure 5:
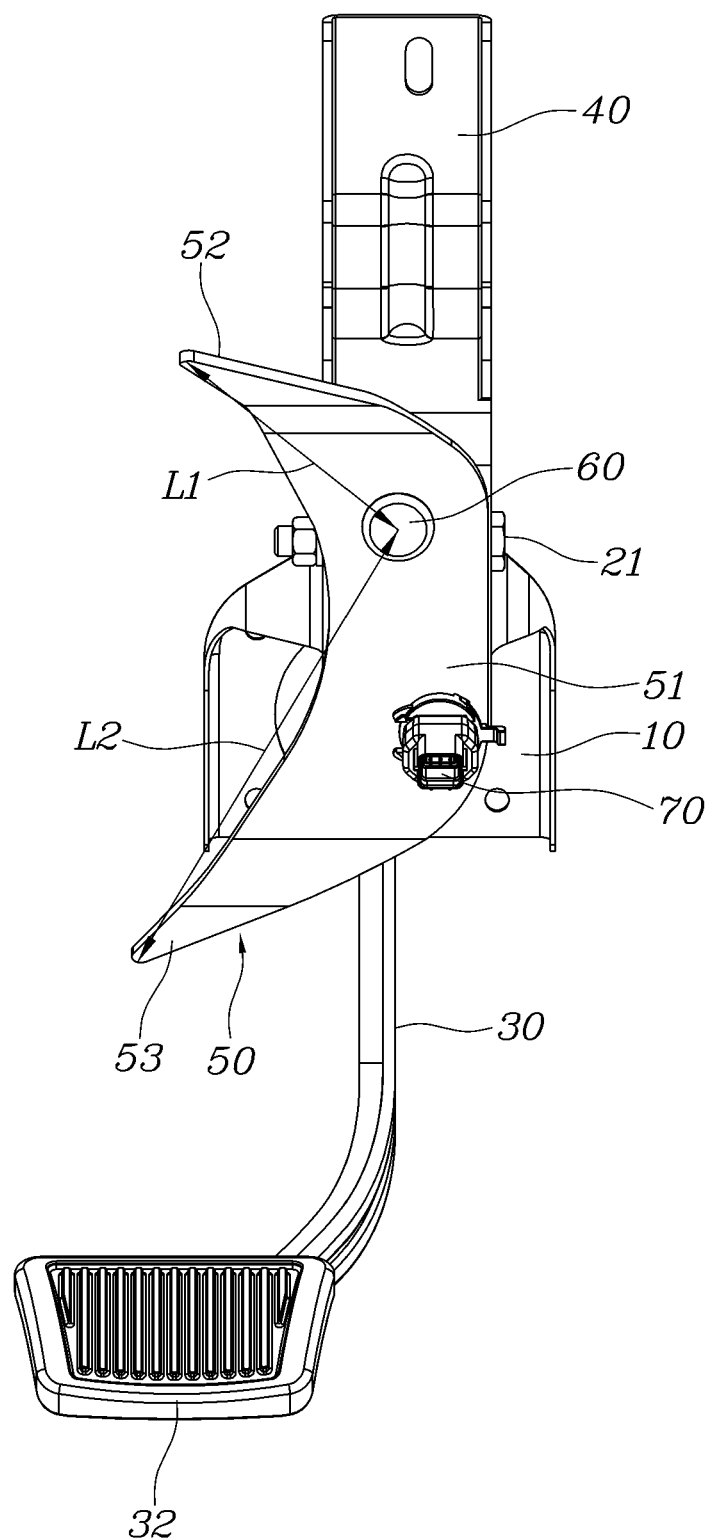
Figure 6:
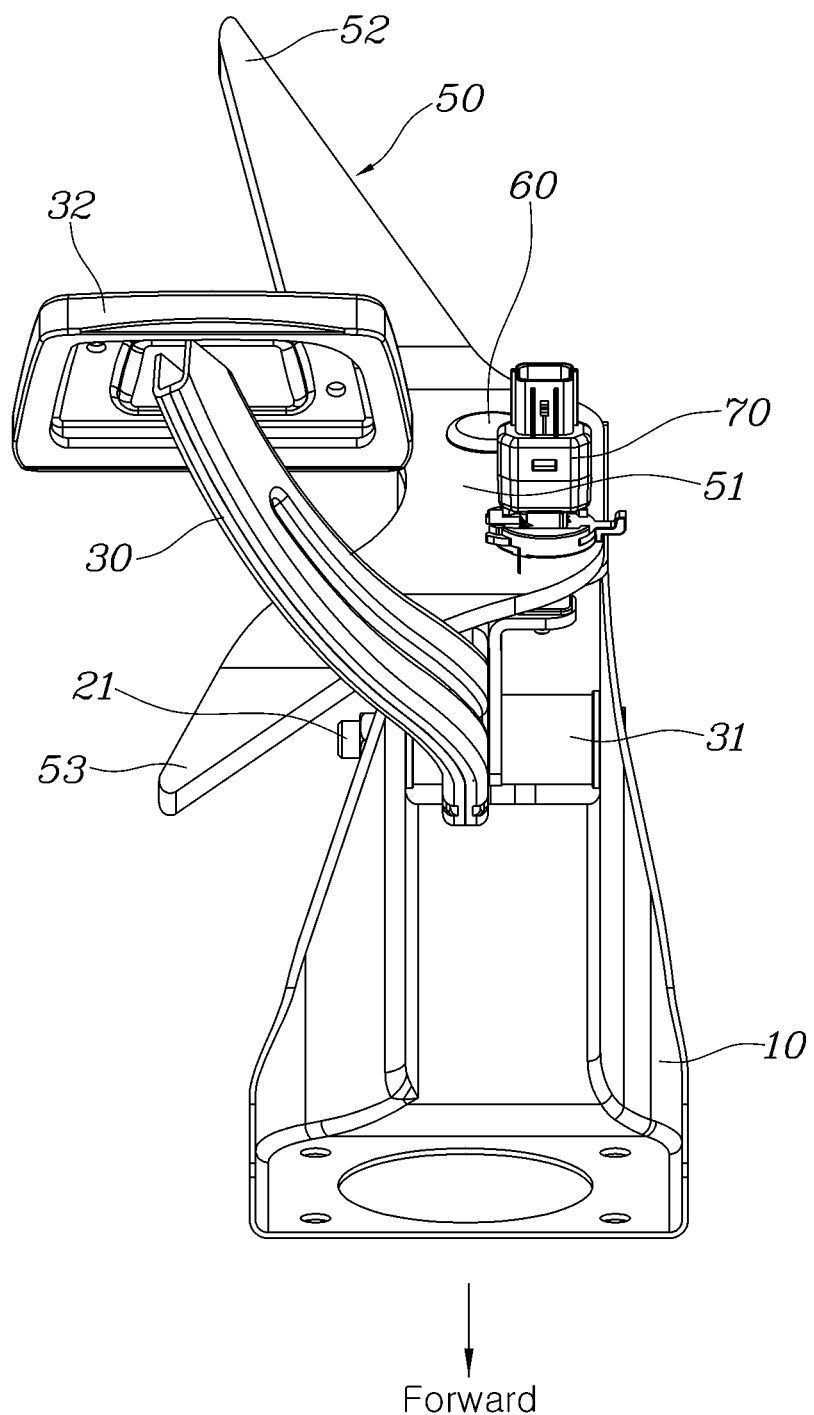
Figure 7:
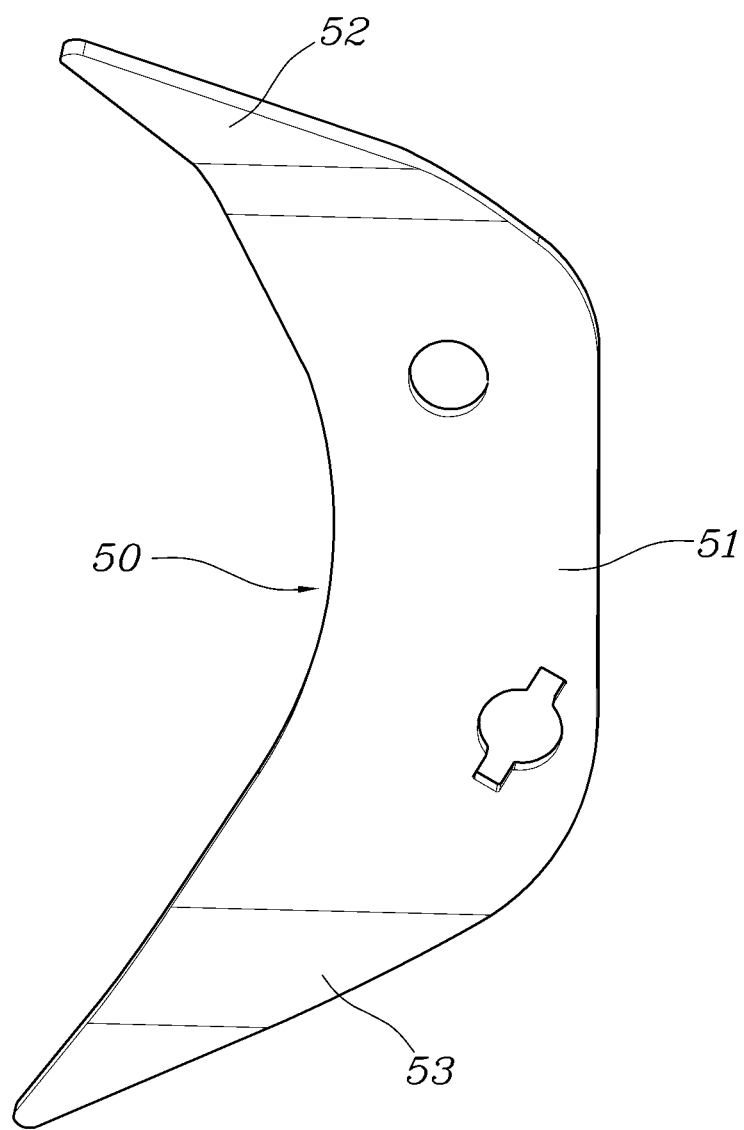
FIGS. 7 and 8 are a front view and a side view illustrating a collision rotation bracket according to the illustrated embodiment of the present invention.
Figure 8:
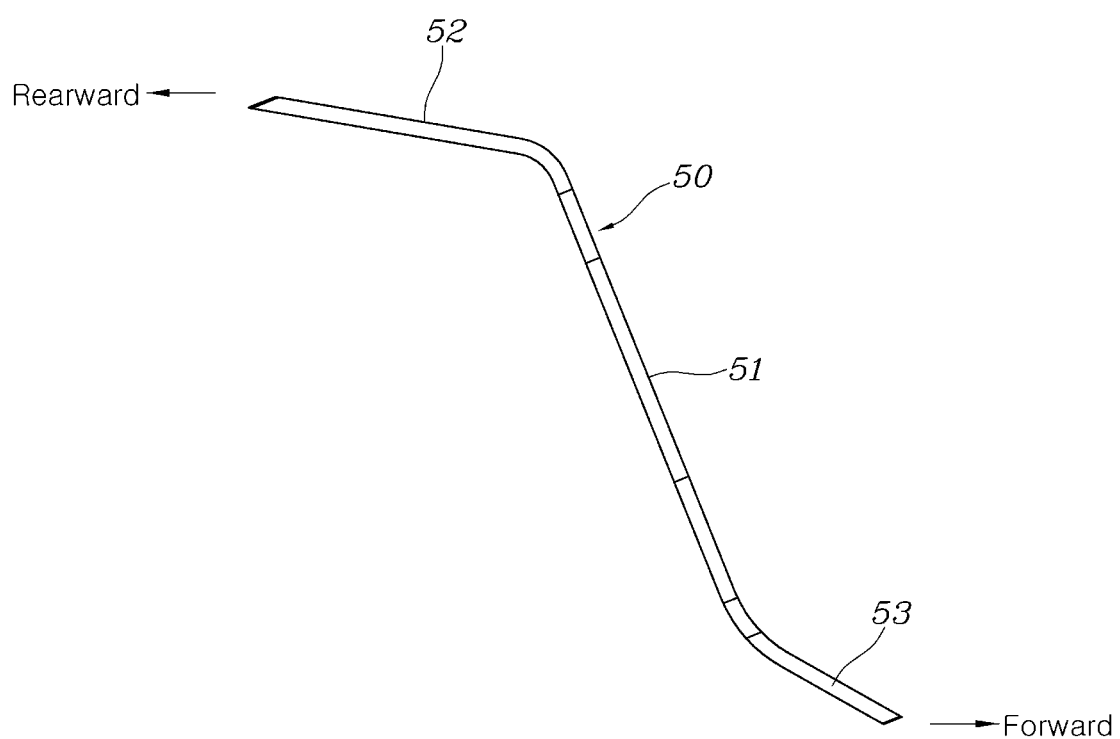

Hereinafter, a pedal apparatus for protection of a driver according to a preferred embodiment of the present invention will be described with reference to the accompanying drawings.

As shown in FIGS. 1 to 11, the pedal apparatus for protection of the driver according to the illustrated embodiment of the present invention includes a pedal member 10 fixedly installed at a dash panel disposed beneath a driver seat, and a pedal arm 30 coupled to the pedal member 10 by means of a hinge bolt 21 and a nut 22 such that the pedal arm 30 is rotatable in forward and rearward directions. The pedal apparatus further includes a cowl bracket 40 fixedly coupled to an upper portion of the pedal member 10 through welding, and a collision rotation bracket 50 coupled to the cowl bracket 40.

The pedal member 10 is coupled, at a front portion thereof, to the dash panel 1. Left and right side portions of the pedal member 10, which extend rearwards from the front portion of the pedal member 10, are formed to be parallel. The pedal member 10 has a structure open in a rearward direction and in a vertical direction.

Bolt holes 11 are formed to extend through the left and right side portions of the pedal member 10, respectively. The hinge bolt 21 is coupled to the nut 22 after extending sequentially through one of the bolt holes 11, a hinge pipe 31 of the pedal arm 30 and the other of the bolt holes 11 in this order. Accordingly, the pedal arm 30 is coupled to the pedal member 10 such that the pedal arm 30 is rotatable about the hinge bolt 21 in forward and rearward directions with respect to the pedal member 10.

The hinge pipe 31 is coupled to an upper end of the pedal arm 30. A pad 32, which is manipulated by the foot of the driver, is coupled to a lower end of the pedal arm 30.

The cowl bracket 40 is fixedly coupled to the pedal member 10 through welding in order to cover opened upper and rear portions of the pedal member 10. A cowl panel is coupled to an upper extension extending upwards from the cowl bracket 40.

In the illustrated embodiment of the present invention, the collision rotation bracket 50 is coupled, through a double coupling point structure, to a surface of the cowl bracket 40 directed in a rearward direction by means of a rotation shaft 60 and a stop lamp switch 70.

The rotation shaft 60, which connects the cowl bracket 40 and the collision rotation bracket 50, is a coupling element such as a rivet or a bolt or a coupling element formed through hemming. The rotation shaft 60 functions as a rotation center in order to enable the collision rotation bracket 50 to rotate with respect to the cowl bracket 40.

The stop lamp switch 70 contacts a switch bracket 80 coupled to the pedal arm 30 when the driver does not manipulate the pedal arm 30 or the pedal arm 30, which has rotated forwards, is retuned through rearward rotation thereof carried out by elastic force of a pedal spring. When the stop lamp switch 70 contacts the switch bracket 80, the stop lamp switch 70 does not generate a manipulation signal of the pedal arm 30. The stop lamp switch 70 generates the manipulation signal of the pedal arm 30 when the switch bracket 80 is separated from the stop lamp switch 70 in accordance with manipulation of the pedal arm 30 by the driver.

In addition, the stop lamp switch 70 is a switch made of a plastic material. Accordingly, when external impact is applied to the stop lamp switch 70, the stop lamp switch 70 is collapsed in shape and, as such, may be easily separated from the cowl bracket 40 or from the collision rotation bracket 50.

Accordingly, when the pedal member 10 is moved rearwards due to impact force F1 generated upon occurrence of a collision accident, the collision rotation bracket 50 coupled to the cowl bracket 40 comes into contact with a vehicle body fixture 90. When the collision rotation bracket 50 comes into contact with the vehicle body fixture 90, the stop lamp switch 70 is easily separated from the cowl bracket 40. When the stop lamp switch 70 is separated from the cowl bracket 40, the collision rotation bracket 50 rotates about the rotation shaft 60. In accordance with rotation of the collision rotation bracket 50 about the rotation shaft 60, rotation force of the collision rotation bracket 50 is transmitted to the pedal arm 30, thereby causing the pedal arm 30 to be forcibly rotated in a forward direction. Accordingly, rearward thrust and rearward rotation of the pedal arm 30 may be prevented and, as such, injury of the driver leg caused by the pedal arm 30 may be maximally prevented.

For stable rotation of the collision rotation bracket 50 upon occurrence of a collision accident, the cowl bracket 40 preferably has greater strength and rigidity than the pedal member 10 and the collision rotation bracket 50. To this end, the cowl bracket 40 has a feature in that the cross-sectional thickness thereof is relatively greater than those of the pedal member 10 and the collision rotation bracket 50. Of course, embodiments of the present invention are not limited to such a condition.

In accordance with the illustrated embodiment of the present invention, the collision rotation bracket 50 includes an intermediate coupling section 51 coupled to the cowl bracket 40 by means of the rotation shaft 60 and the stop lamp switch 70, and an upper contact section 52 extending upwards from the intermediate coupling section 51 while being configured to come into contact with the vehicle body fixture 90 when the pedal member 10 is thrust rearwards upon occurrence of a collision accident. The collision rotation bracket 50 further includes a lower rotation section 53 extending downwards from the intermediate coupling section 51 while being configured to forcibly push the pedal arm 30 in a forward direction when the collision rotation bracket 50 rotates due to contact thereof with the vehicle body fixture 90, thereby causing the pedal arm 30 to be forcibly rotated in the forward direction.

In the illustrated embodiment of the present invention, the rotation shaft 60 and the stop lamp switch 70 are in a coupled state before occurrence of a collision accident and, as such, the collision rotation bracket 50 is maintained in a normal state in which the collision rotation bracket 50 does not rotate with respect to the cowl bracket 40, when the collision rotation bracket 50 is under the condition that the collision rotation bracket 50 is coupled to the cowl bracket 40 by means of the rotation shaft 60 and the stop lamp switch 70.

However, when the stop lamp switch 70 is separated from the cowl bracket 40 as the upper contact section 52 of the collision rotation bracket 50 comes into contact with the vehicle body fixture 90 upon occurrence of a collision accident, as described above, the collision rotation bracket 50 rotates about the rotation shaft 60. In this case, the pedal arm 30 receives rotation force of the collision rotation bracket 50 and, as such, is forcibly reversely rotated in a forward direction.

The upper contact section 52 of the collision rotation bracket 50 is formed to be inclined toward one side of the pedal arm 30 while extending upwards from the intermediate coupling section 51. The upper contact section 52 is also bent to protrude rearwards toward the vehicle body fixture 90.

The lower rotation section 53 of the collision rotation bracket 50 is formed to be inclined toward one side of the pedal arm 30 while extending downwards from the intermediate coupling section 51, similarly to the upper contact section 52. The lower rotation section 53 is also bent to protrude forwards such that the lower rotation section 53 contacts one surface of the pedal arm 30.

In addition, in accordance with the illustrated embodiment of the present invention, the collision rotation bracket 50 has a structure in which a linear distance L2 from the center of the rotation shaft 60 to an end of the lower rotation section 53 is greater than a linear distance L1 from the center of the rotation shaft 60 to an end of the upper contact section 52. Preferably, the collision rotation bracket 50 has a structure in which the linear distance L1 is about 2 times the linear distance L2.

Accordingly, assuming that the upper contact section 52 moves about 5 mm when the collision rotation bracket 50 rotates about the rotation shaft 60, the lower rotation section 53 moves about 10 mm corresponding to 2 times the movement distance of the upper contact section 52. Accordingly, there is an advantage in that, even when the collision rotation bracket 50 rotates through a small rotation angle, the forward rotation amount of the pedal arm 30 contacting the lower rotation section 53 is greatly increased.

The pedal arm 30 in the illustrated embodiment of the present invention may be a pedal arm employed in one of the brake pedal, the clutch pedal and the accelerator pedal in the vehicle.

Hereinafter, functions of the pedal apparatus according to the illustrated embodiment of the present invention will be described.

Figure 9:
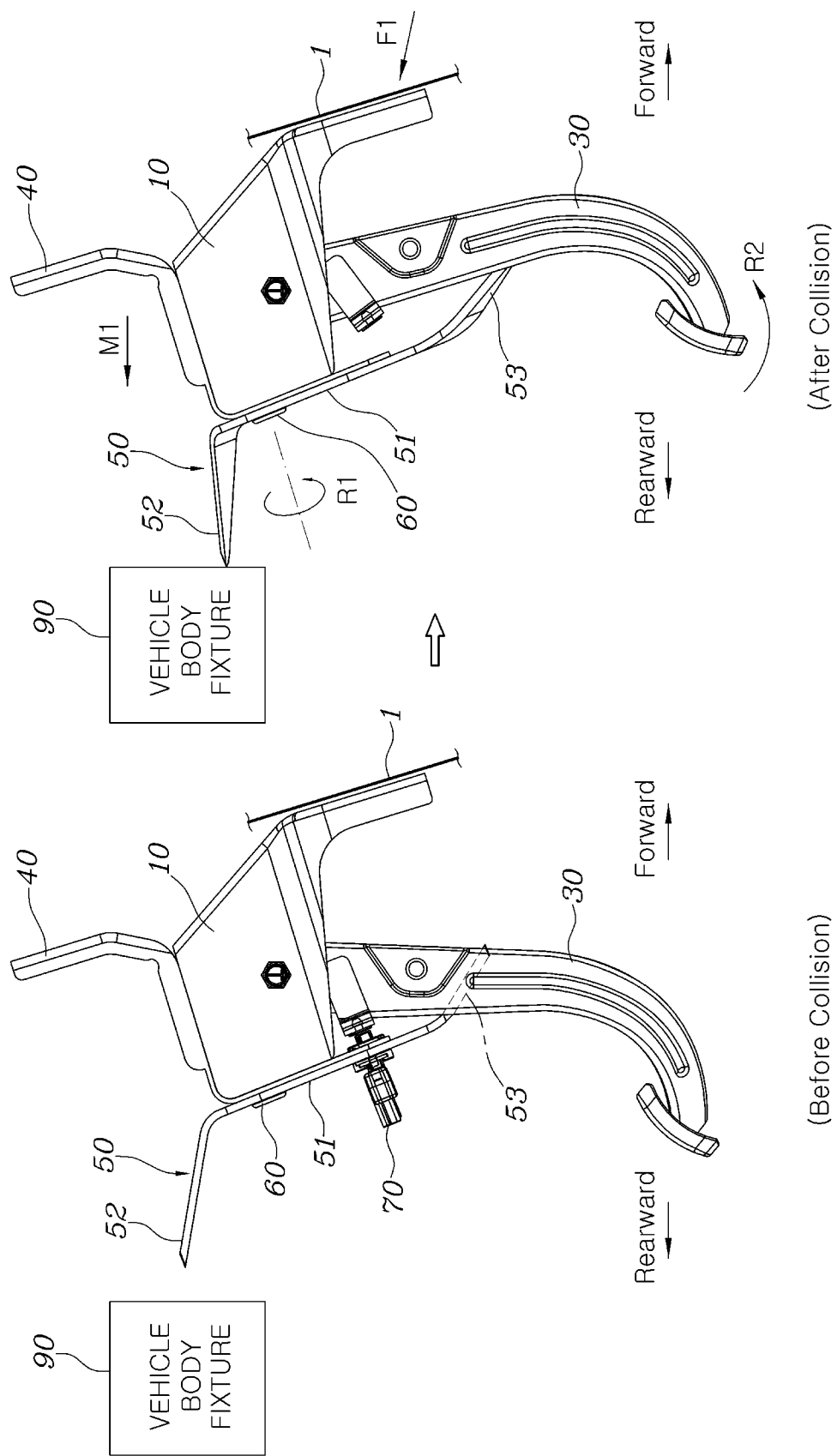
FIGS. 9 to 11 illustrate the pedal apparatus before and after collision, FIG. 9 being a side view of the pedal apparatus including the collision rotation bracket in accordance with the illustrated embodiment of the present invention, and FIGS. 10 and 11 being a plan view and a bottom view corresponding to FIG. 9.
Figure 10:
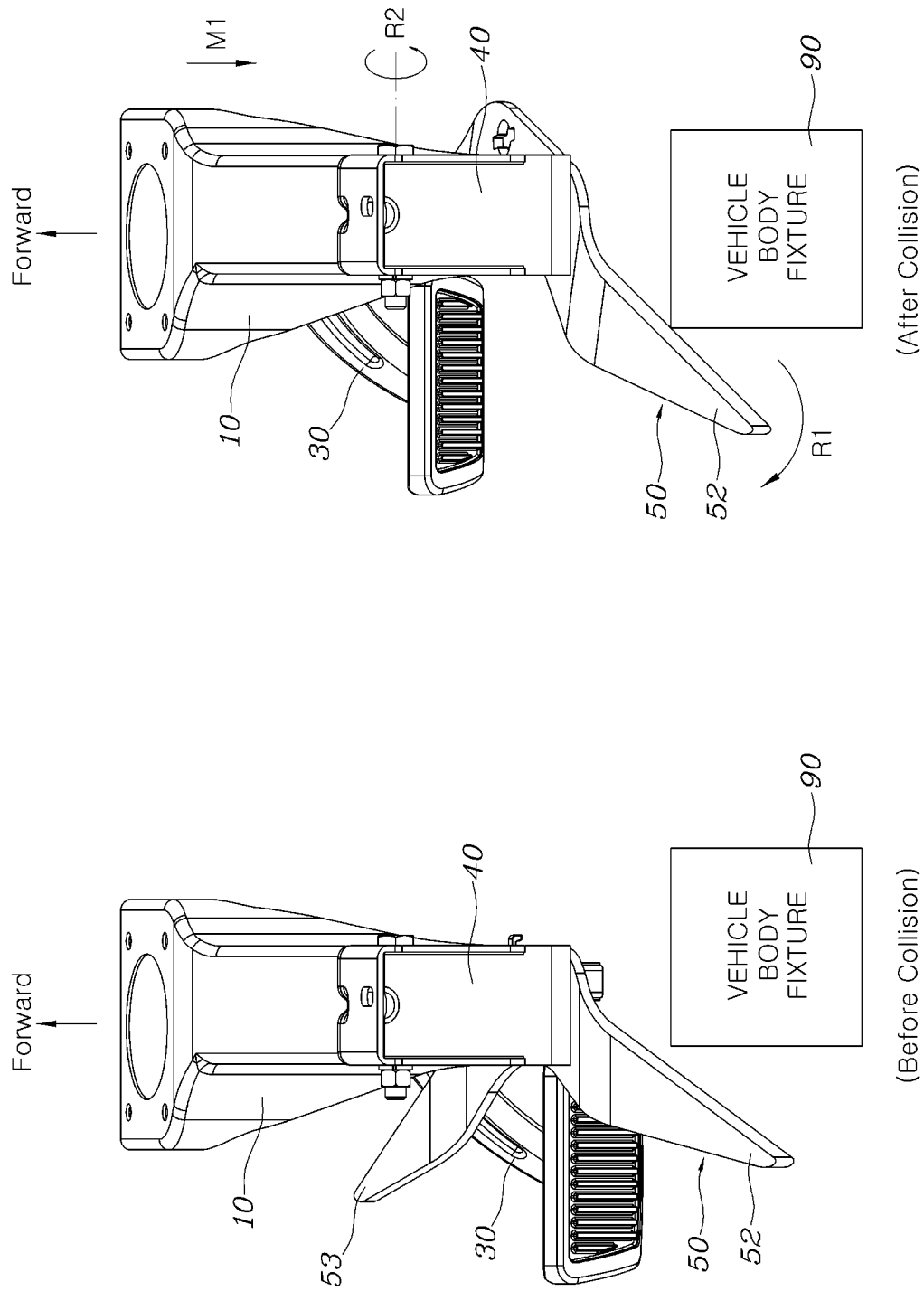
Figure 11:
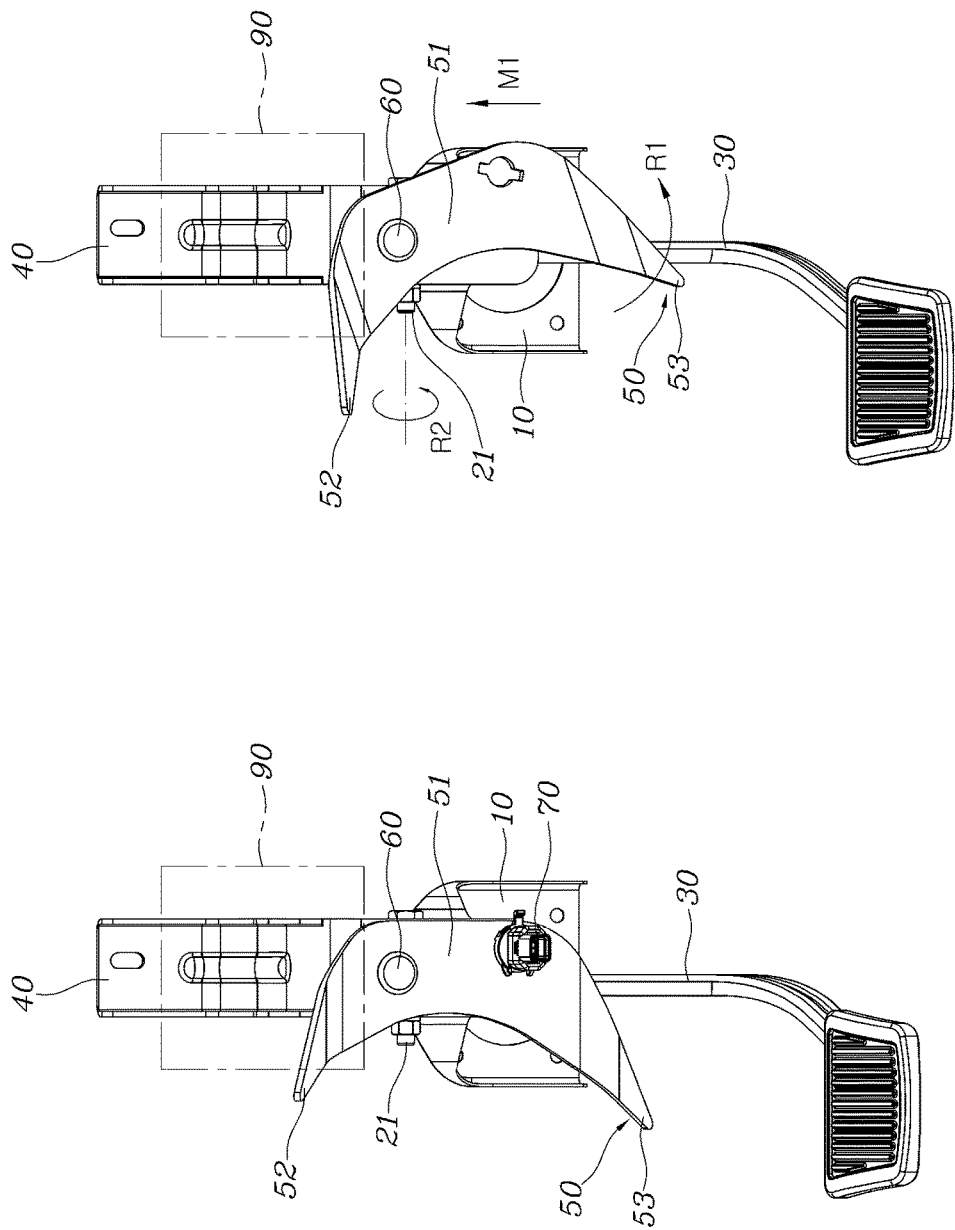

In FIGS. 9 to 11, states of the pedal apparatus before and after collision are shown, respectively. FIG. 9 is a side view of the pedal apparatus including the collision rotation bracket according to the illustrated embodiment of the present invention. FIGS. 10 and 11 are plan and bottom views corresponding to FIG. 9, respectively.

Oblique offset collision is a situation in which a vehicle collides with a barrier under a research moving deformable barrier (RMDB) condition of a vehicle speed of 90 km/h, a collision angle of 15° inclination, and an offset amount of 35%. The oblique offset collision is severe in vehicle speed and barrier load, as compared to small overlap collision.

Left figures in FIGS. 9 to 11 show a normal state in which no collision accident occurs. When the driver depresses the pedal, the pedal arm 30 is rotated about the hinge bolt 21 in forward and rearward directions. In this case, the collision rotation bracket 50 is maintained in normal state in which the collision rotation bracket 50 does not rotate with respect to the cowl bracket 40 because the collision rotation bracket 50 is in a state of being coupled to the cowl bracket 40 by means of the rotation shaft 60 and the stop lamp switch 70.

Right figures in FIGS. 9 to 11 show a situation in which a collision accident, in particular, an oblique offset collision, occurs.

When a collision accident, in particular, an oblique offset collision, occurs, collision energy is transmitted to the pedal arm 30 in an inclined direction from a front lower side to a rear upper side such that the pedal arm 30 is inclined by a predetermined inclination angle while being offset by a predetermined angle (an arrow F1).

That is, when the pedal member 10 is moved rearwards (an arrow M1) together with the dash panel 1 by impact force F1 generated upon a collision accident, the upper contact section 52 of the collision rotation bracket 50 coupled to the cowl bracket 40 comes into contact with the vehicle body fixture 90 disposed in rear of the pedal arm 30 above the pedal arm 30.

When the upper contact section 52 of the collision rotation bracket 50 comes into contact with the vehicle body fixture 90, the stop lamp switch 70, which is made of a plastic material, is easily separated from the cowl bracket 40 due to impact applied due to contact of the upper contact section 52. When the stop lamp switch 70 is separated from the cowl bracket 40, the collision rotation bracket 50 is rotated about the rotation shaft 60 (an arrow R1).

When the collision rotation bracket 50 rotates about the rotation shaft 60, the lower rotation section 53 of the collision rotation bracket 50 pushes the pedal arm 30 to be forcibly moved in a forward direction. Accordingly, the pedal arm 30 receives rotation force of the collision rotation bracket 50 via the lower rotation section 53 and, as such, is forcibly rotated about the hinge bolt 21 in a forward direction (an arrow R2). As a result, rearward thrust and rearward rotation of the pedal arm 30 are prevented and, as such, injury of the driver leg caused by the pedal arm 30 may be maximally prevented.

That is, since the pedal arm 30 is forcibly rotated in a forward direction by the collision rotation bracket 50 rotating upon occurrence of a collision accident, it may be possible to prevent injury of the driver such as shank shock or ankle dislocation caused by the pedal. Accordingly, injury of the driver leg caused by the pedal arm 30 may be maximally prevented.

In addition, the illustrated embodiment of the present invention does not employ a configuration in which a cowl cross bar-side stopper having a cantilever structure, a pedal arm-side stopper, etc. are used, for prevention of rearward thrust (thrust toward the driver seat) and rearward rotation (rotation toward the driver seat) of the pedal arm 30 upon occurrence of a collision accident. Accordingly, there is an advantage in that a driver protection function may be achieved without a great increase in the number of elements. In particular, there are advantages of a reduction in weight and a reduction in cost, as compared to a conventional structure using a cowl cross bar-side stopper and a pedal arm-side stopper.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pedal apparatus for a vehicle, the pedal apparatus comprising:
   a pedal member to which a pedal arm is rotatably coupled;
   a cowl bracket fixedly coupled to the pedal member; and
   a collision rotation bracket coupled to the cowl bracket, wherein the collision rotation bracket is configured to be rotated with respect to the cowl bracket when the collision rotation bracket comes into contact with a vehicle body fixture in accordance with rearward movement of the pedal member caused upon occurrence of a collision accident, and wherein the pedal arm is configured to be forcibly pushed in a forward direction by the collision rotation bracket during rotation of the collision rotation bracket, thereby causing the pedal arm to be forcibly rotated in the forward direction, wherein the collision rotation bracket comprises:
   an intermediate coupling section coupled to the cowl bracket by a rotation shaft and a stop lamp switch;
   an upper contact section extending upwards from the intermediate coupling section, the upper contact section configured to come into contact with the vehicle body fixture when the pedal member is thrust rearwards upon occurrence of the collision accident; and
   a lower rotation section extending downwards from the intermediate coupling section, the lower rotation section configured to forcibly push the pedal arm in the forward direction when the collision rotation bracket rotates due to contact thereof with the vehicle body fixture, thereby causing the pedal arm to be forcibly rotated in the forward direction.

2. The pedal apparatus according to claim 1, wherein:
   the cowl bracket and the collision rotation bracket are coupled through a double coupling point structure provided by the rotation shaft and the stop lamp switch;
   the stop lamp switch is configured to be separated from the cowl bracket when the collision rotation bracket comes into contact with the vehicle body fixture in accordance with the rearward movement of the pedal member caused upon occurrence of the collision accident;
   the collision rotation bracket is configured to rotate about the rotation shaft when the stop lamp switch is separated from the cowl bracket; and
   the pedal arm is configured to be forcibly rotated in the forward direction by rotation force of the collision rotation bracket generated when the collision rotation bracket rotates about the rotation shaft.

3. The pedal apparatus according to claim 1, wherein the pedal apparatus is configured so that:
   the collision rotation bracket does not rotate with respect to the cowl bracket when the collision rotation bracket is in a state of being coupled to the cowl bracket by the rotation shaft and the stop lamp switch before occurrence of the collision accident; and
   the collision rotation bracket is rotated about the rotation shaft when the stop lamp switch is separated from the cowl bracket as the upper contact section comes into contact with the vehicle body fixture due to the collision accident.

4. The pedal apparatus according to claim 1, wherein the upper contact section is formed to be inclined toward one side of the pedal arm while extending upwards from the intermediate coupling section.

5. The pedal apparatus according to claim 4, wherein the upper contact section is bent to protrude rearwards.

6. The pedal apparatus according to claim 1, wherein the lower rotation section is formed to be inclined toward one side of the pedal arm while extending downwards from the intermediate coupling section.

7. The pedal apparatus according to claim 6, wherein the lower rotation section is bent to protrude forwards such that the lower rotation section contacts one surface of the pedal arm.

8. The pedal apparatus according to claim 1, wherein the collision rotation bracket has a structure in which a linear distance from a center of the rotation shaft to an end of the lower rotation section is greater than a linear distance from the center of the rotation shaft to an end of the upper contact section.

9. The pedal apparatus according to claim 1, wherein the cowl bracket has a greater cross-sectional thickness than the pedal member and the collision rotation bracket over the entire length of the cowl bracket such that the cowl bracket has greater rigidity than the pedal member and the collision rotation bracket.

10. A pedal apparatus for a vehicle, the pedal apparatus comprising:
    a pedal member to which a pedal arm is rotatably coupled;
    a cowl bracket fixedly coupled to the pedal member; and
    a collision rotation bracket coupled to the cowl bracket, wherein the collision rotation bracket is configured to be rotated with respect to the cowl bracket when the collision rotation bracket comes into contact with a vehicle body fixture in accordance with rearward movement of the pedal member caused upon occurrence of a collision accident, and wherein the pedal arm is configured to be forcibly pushed in a forward direction by the collision rotation bracket during rotation of the collision rotation bracket, thereby causing the pedal arm to be forcibly rotated in the forward direction;

wherein the cowl bracket and the collision rotation bracket are coupled through a double coupling point structure provided by a rotation shaft and a stop lamp switch;

wherein the stop lamp switch is configured to be separated from the cowl bracket when the collision rotation bracket comes into contact with the vehicle body fixture in accordance with the rearward movement of the pedal member caused upon occurrence of the collision accident;

wherein the collision rotation bracket is configured to rotate about the rotation shaft when the stop lamp switch is separated from the cowl bracket; and wherein the pedal arm is configured to be forcibly rotated in the forward direction by rotation force of the collision rotation bracket generated when the collision rotation bracket rotates about the rotation shaft.

11. The pedal apparatus according to claim 10, wherein the cowl bracket has a greater cross-sectional thickness than the pedal member and the collision rotation bracket over the entire length of the cowl bracket such that the cowl bracket has greater rigidity than the pedal member and the collision rotation bracket.

12. The pedal apparatus according to claim 10, wherein the pedal arm is a brake pedal, a clutch pedal or an accelerator pedal.

13. A vehicle comprising:
a vehicle body fixture;
a pedal member to which a pedal arm is rotatably coupled;
a cowl bracket fixedly coupled to the pedal member;
a rotation shaft;
a stop lamp switch; and
a collision rotation bracket including a collision rotation bracket intermediate coupling section, a collision rotation bracket upper contact section and a collision rotation bracket lower rotation section;

wherein the collision rotation bracket intermediate coupling section is coupled to the cowl bracket by the rotation shaft and the stop lamp switch;

wherein the collision rotation bracket upper contact section extends upwards from the collision rotation bracket intermediate coupling section, and the collision rotation bracket upper contact section is configured to come into contact with the vehicle body fixture when the pedal member is thrust rearwards upon occurrence of a collision accident; and wherein the collision rotation bracket lower rotation section extends downwards from the collision rotation bracket intermediate coupling section, and the collision rotation bracket lower rotation section is configured to forcibly push the pedal arm in a forward direction when the collision rotation bracket rotates due to thereof with the vehicle body fixture, thereby causing the pedal arm to be forcibly rotated in the forward direction.

14. The vehicle according to claim 13, wherein the collision rotation bracket is configured to not rotate with respect to the cowl bracket when the collision rotation bracket is in a state of being coupled to the cowl bracket by the rotation shaft and the stop lamp switch before occurrence of the collision accident; and the collision rotation bracket is configured to rotate about the rotation shaft when the stop lamp switch is separated from the cowl bracket as the collision rotation bracket upper contact section comes into contact with the vehicle body fixture due to the collision accident.

15. The vehicle according to claim 13, wherein the collision rotation bracket upper contact section is formed to be inclined toward one side of the pedal arm while extending upwards from the collision rotation bracket intermediate coupling section.

16. The vehicle according to claim 15, wherein the collision rotation bracket upper contact section is bent to protrude rearwards.

17. The vehicle according to claim 13, wherein the collision rotation bracket lower rotation section is formed to be inclined toward one side of the pedal arm while extending downwards from the collision rotation bracket intermediate coupling section.

18. The vehicle according to claim 17, wherein the collision rotation bracket lower rotation section is bent to protrude forwards such that the collision rotation bracket lower rotation section contacts one surface of the pedal arm.

* * * * *